May 23, 1944. F. B. DAVIS 2,349,487
FEED MECHANISM
Original Filed Aug. 19, 1939 4 Sheets-Sheet 1
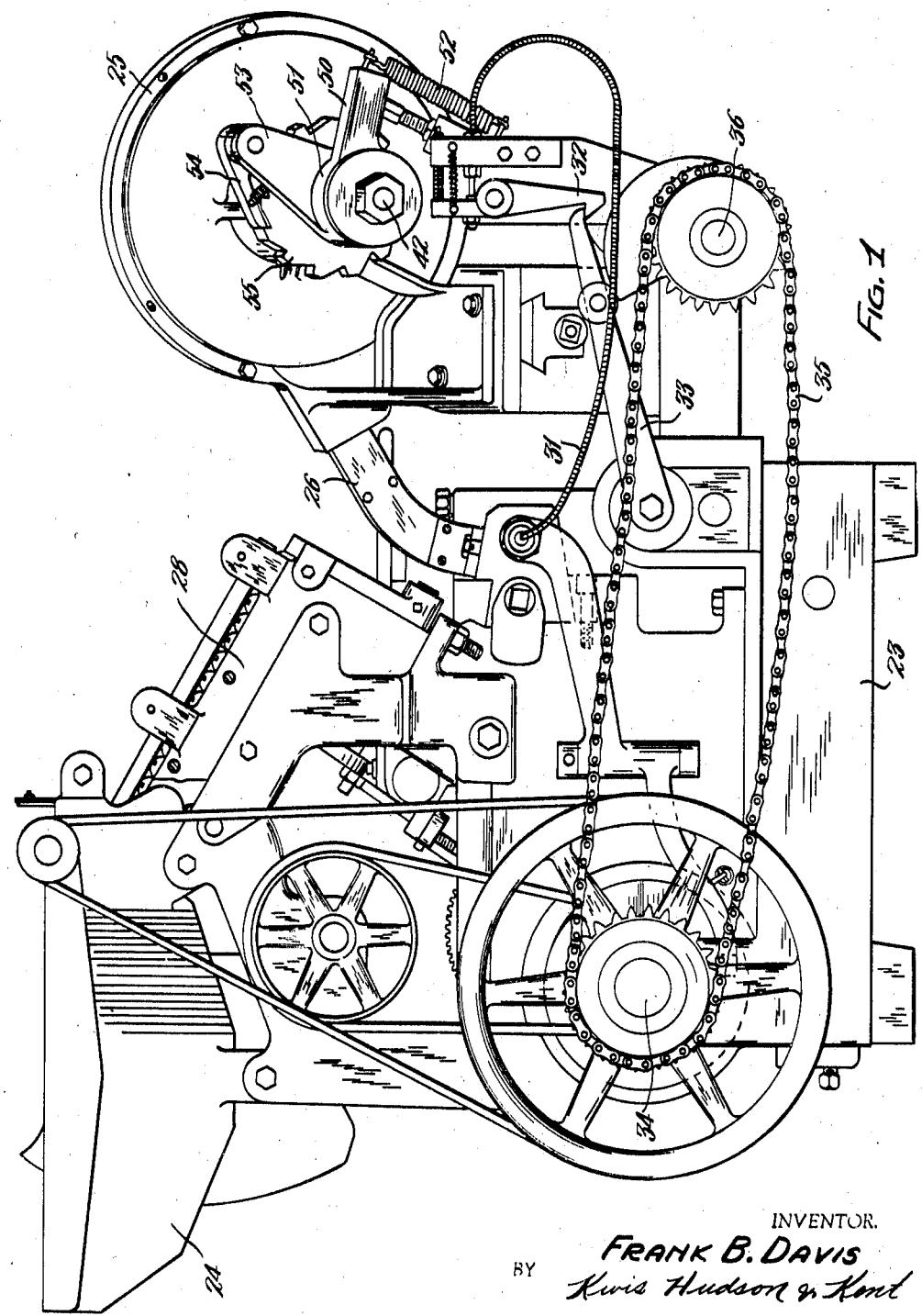
INVENTOR.
FRANK B. DAVIS
BY Kwis Hudson & Kent
ATTORNEYS

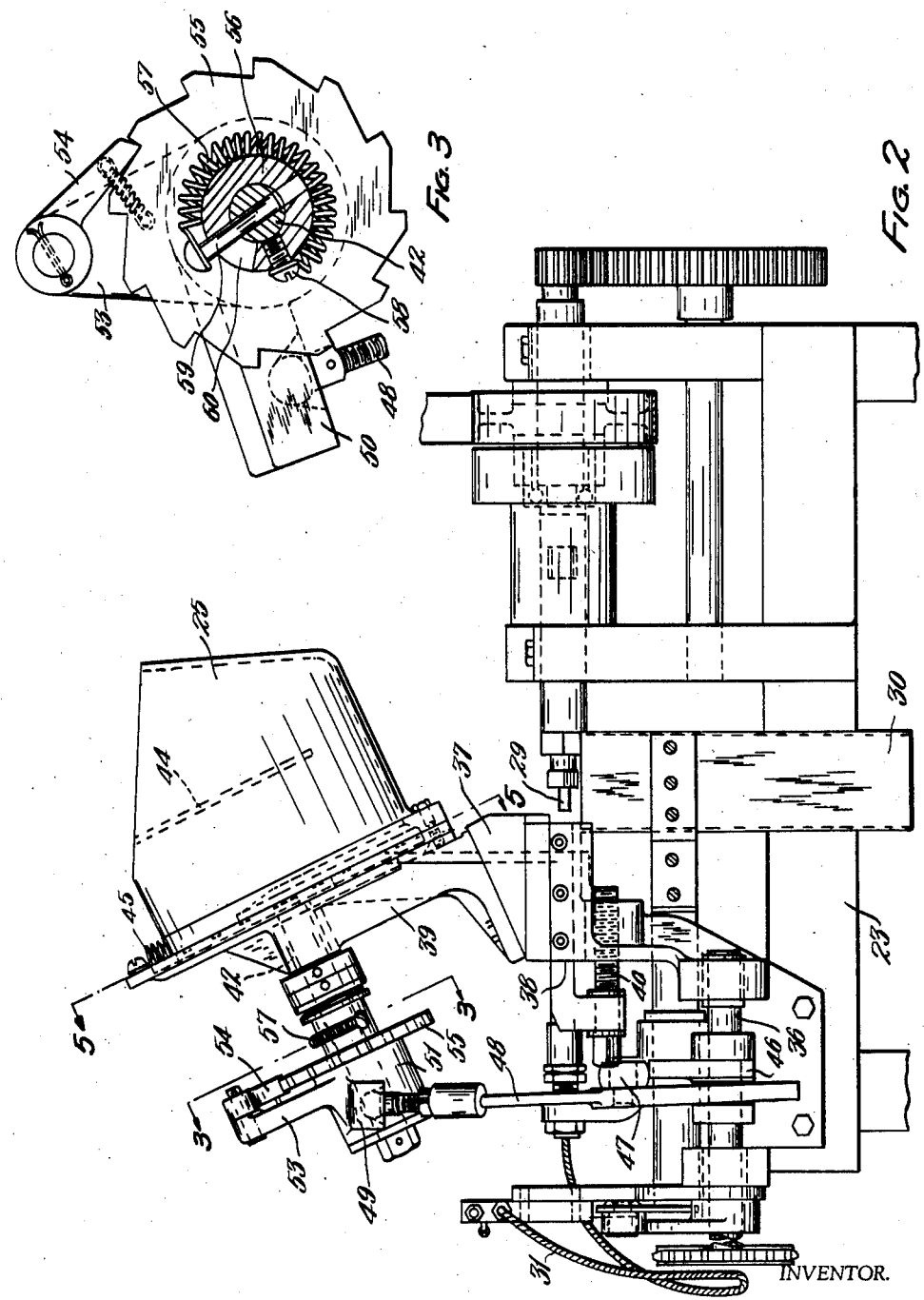

May 23, 1944.  F. B. DAVIS  2,349,487
FEED MECHANISM
Original Filed Aug. 19, 1939  4 Sheets-Sheet 3

INVENTOR.
FRANK B. DAVIS
BY
Kwis Hudson & Kent
ATTORNEYS

May 23, 1944. F. B. DAVIS 2,349,487
FEED MECHANISM
Original Filed Aug. 19, 1939    4 Sheets-Sheet 4

INVENTOR.
FRANK B. DAVIS
BY Kwis Hudson & Kent
ATTORNEYS

Patented May 23, 1944

UNITED STATES PATENT OFFICE 2,349,487

FEED MECHANISM

Frank B. Davis, University Heights, Ohio, assignor to The National Screw & Manufacturing Company, Cleveland, Ohio, a corporation of Ohio Original application August 19, 1939, Serial No. 291,049. Divided and this application September 27, 1941, Serial No. 412,669

2 Claims. (Cl. 10—169)

This invention relates to a feeding mechanism adapted particularly for feeding small irregularly shaped objects, such as toothed lock washers. This application is a division of my prior application Serial No. 291,049, filed August 19, 1939, for Assembling machine for screws and washers.

My invention finds especial utility in a machine for assembling screws and washers where it is desirable that the washers be fed one at a time to the assembling point from a hopper containing a batch or mass of loose washers to be fed.

Heretofore considerable difficulty has been encountered in providing a satisfactory feed for the washers in a machine of this type particularly as the washers have a tendency to become hooked or fastened together. Accordingly, in machines for this general purpose employed heretofore it has been customary to arrange the washers by hand in superposed relation in a tube or tubular magazine and to feed the washers from either the upper end or the lower end of the column of washers in the magazine to the assembling point. This arrangement is unsatisfactory since it involves the prehandling of the washers which adds to the cost of the finished product.

The principal object of the present invention is to provide an efficient and reliable feed mechanism for articles such as small toothed lock washers so as to avoid prehandling or the arranging of the washers in columnar form in a tubular magazine, and to feed them from a batch or mass contained in a hopper with the assurance that they will be delivered one at a time and at regular intervals to the assembling point in coordination with the feed of the screws or screw elements and with the operation of the plunger or other member which serves to slide the washer onto the screw next to the head.

In the accompanying sheets of drawings wherein I have shown my invention applied to a screw and washer assembling machine by way of example only and not as a limitation on its use, Fig. 1 is an end elevation of the assembling machine to which my improved feed mechanism is applied;

Fig. 2 is a front view looking toward the left of Fig. 1, some of the parts being omitted;

Fig. 3 is a detail sectional view substantially along the line 3—3 of Fig. 2;

In the assembling machine herein illustrated and of which my improved feed mechanism is a part, the screws are fed from one hopper and the washers from another hopper, and mechanism is provided so that during each cycle of the machine a washer and a screw are brought to the assembling point with the washer held in a given position in a die and with the screw positioned opposite the central opening in the washer, and then a plunger pushes the screw forwardly through the opening in the washer so as to position the washer on the shank of the screw next to the screw head. Then the screw and washer assembly is pushed out of the die and is delivered to a receiving receptacle, but if for any reason the screw fails to receive a washer or if the screw is somewhat longer than desired, an assorter or separator automatically functions to cause the screw without the washer or the longer screw with the assembled washer to be discharged into another receptacle.

Figure 7:
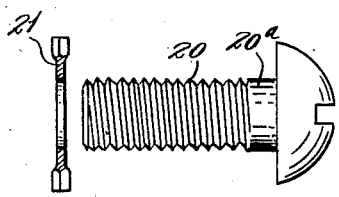
Fig. 7 shows one of the screws and a lock washer prior to assembly, the washer here shown being toothed at its outer periphery only.
Figure 8:
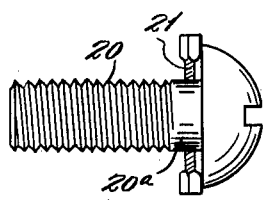
Fig. 8 is a view of the same after the assembling operation, the washer in Figs. 7 and 8 being in section and the screw being in elevation.
Figure 9:
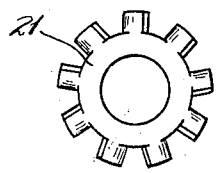
Fig. 9 is a face view of the lock washer shown in Figs. 7 and 8.

The screws which are handled in the assembling machine are preferably such as illustrated in Figs. 7 and 8 and designated 20, these screws having their shanks threaded prior to assembly with the washers, and in the assembling operation, by an endwise movement of the screw when aligned with the opening in the washer 21, as shown in Fig. 7, the washer is moved onto a short unthreaded portion 20a of the screw next to the screw head, as shown in Fig. 8. The unthreaded portion 20a may be cylindrical or slightly tapered, but in either event the washer will be slid on and after assembly will have a friction-tight fit on the unthreaded portion of the screw next to the head. The washers are preferably hardened lock washers which may be toothed at their outer periphery as shown in Figs. 7, 8 and 9, or they may be toothed at their inner periphery, or at both the inner and outer peripheries as shown at 22 in Fig. 10, or they may be otherwise shaped to serve as lock washers.

It is to be understood that the assembling machine may be employed for assembling washers on screw blanks the shanks of which are adapted to be threaded after the assembling operation. Therefore, in the following description the term "screw" is intended to include a screw whose shank is threaded or unthreaded at the time the assembling occurs, and the term "washer" will apply to a washer which is formed as a lock washer in any of the standard ways or which is a plain washer.

Inasmuch as the assembling machine as a whole is fully described in my application Serial No. 291,049, filed August 19, 1939, the parts of the machine which are not essential to the operation of the feed mechanism will be only briefly described.

The machine includes a bed 23 on which is supported in any suitable manner a screw hopper 24 and a washer hopper 25. The manner in which the latter is supported will be explained presently. The washers are delivered one at a time from the hopper 25 by a novelly arranged and functioning feed disk and they pass one at a time through a delivery chute 26 into a washer holder in the form of a die at the assembling point designated 27 in Fig. 4. The screws are supplied and are fed down an inclined chute 28 and they are delivered by mechanism not herein illustrated one at a time to a position in line with a washer in the die at the assembling point 27. Just as soon as the washer and the screw are delivered in line with each other, the screw is pushed forwardly so that its shank passes through the opening in the washer until the washer is assembled next to the head of the screw, as shown in Fig. 8, and this is accomplished by a reciprocating pusher 29 which is illustrated in Fig. 2.

Figure 4:
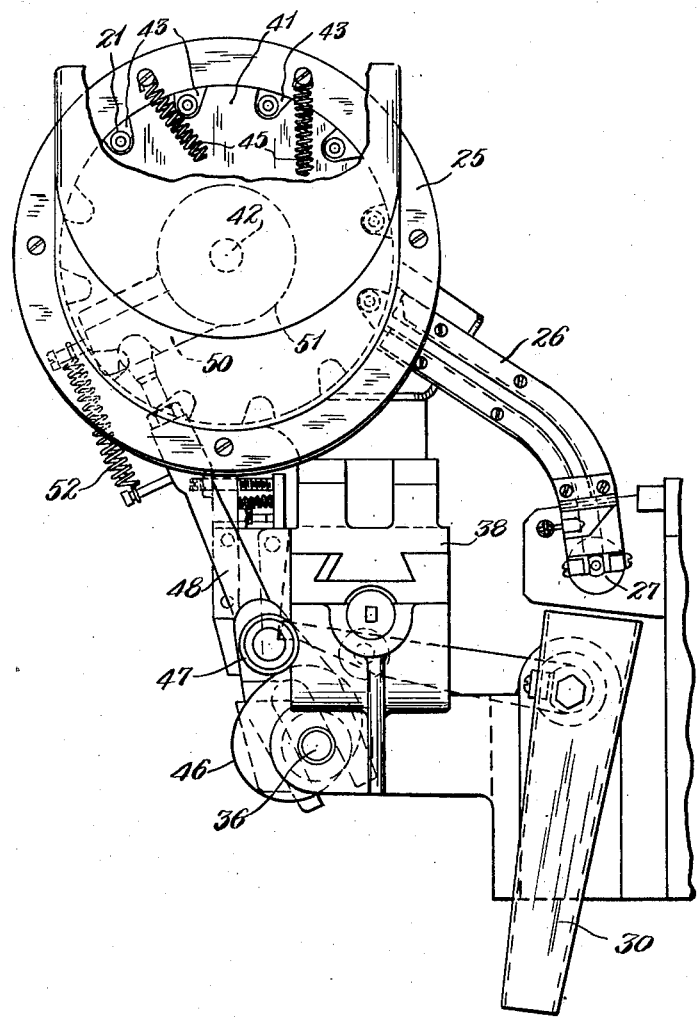
Fig. 4 is a view partly in end elevation showing part of the machine and looking in a direction opposite that of Fig. 1, the bed being omitted and some of the mechanism being omitted and parts being broken away.

After the assembling operation, the pusher 29 is retracted and an ejector which is not shown and which operates in the die which receives the washer at the assembling point ejects the assembly and normally the assemblies fall into a receptacle 30 which is shown in Figs. 2 and 4, as fully explained in my parent application referred to above. If by chance a screw did not receive a washer during the assembling operation or if screws of longer length than desired happen to be fed downwardly in line with the pusher, an assorter comes into action so as to swing the receptacle 30 and cause the assembly to be discharged into another receptacle. The entire assorter is not herein illustrated but it includes a flexible shaft or cable 31 which is adapted to actuate a latch 32 so as to release an arm 33 and allow the receptacle 30 to swing so as to discharge the defective assembly into another receptacle or chamber. The assorter very briefly described above is claimed in a divisional application Serial No. 407,614, filed August 20, 1941.

All of the parts of the mechanism described above, including the parts for feeding the washers, the parts for feeding the screws, and the parts for operating the pusher, are operated in predetermined timed relation by a cam shaft 34 and by a shaft 36 which is connected to and driven by shaft 34 at the same speed as shaft 34 is driven by chain and sprocket gearing 35 (see Fig. 1) having a one-to-one ratio. The shaft 36 is instrumental in the operation of the novelly functioning feed disk of the washer feed mechanism.

I will next describe the washer feed mechanism. The washer feed hopper 25 is supported on an adjustable block 37 (see Fig. 2) carried by an extension 38 of the bed or frame 23. To the adjustable block 37 is secured a standard 39 to which is secured the washer hopper 25. By means of an adjusting screw 40 shown in Fig. 2 the position of the hopper 25 and of the parts associated therewith may be adjusted.

The washer hopper 25 is provided with a pick-up and delivery member 41 in the form of a feed disk which is in inclined position, being preferably inclined about 26° from the vertical. The disk 41, which, as will be seen by reference to Figs. 2 and 6, is located just inside the rear inclined wall of the hopper 25, is secured to an inclined shaft 42 journaled in a boss at the upper end of the standard 39 and is adapted to be given a step-by-step movement by mechanism to be referred to presently.

The disk 41 is provided with shallow peripheral notches 43 which are somewhat U-shaped and are of a size large enough to accommodate one of the washers. Each notch extends partway through the disk and is, of course, open at the periphery of the disk. As will be observed by reference to Fig. 5, the notches 43 are so shaped that when one of the notches reaches a position in line with the upper end of the washer chute 26 the washer contained in the notch will roll or fall out of the notch and into the chute 26 and will then pass down to the die at the assembling point 27.

Figure 6:
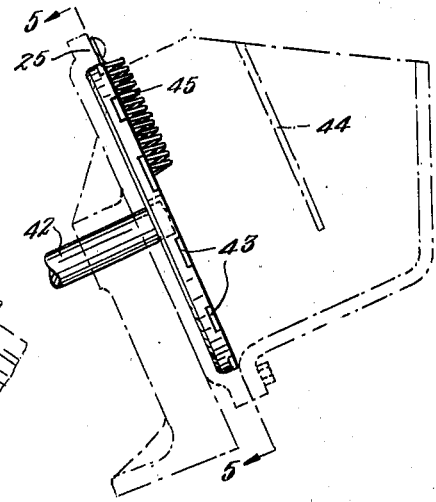
Fig. 6 is a side view of the disk with some of the associated parts shown partly by dotted lines.

A quantity of loose washers is placed in the hopper behind a partition 44, see Figs. 2 and 6, which partition extends across the hopper toward but not to the bottom. The washers pass by gravity underneath this partition into engagement with the lower section of the disk 41, and as the disk is given its step-by-step movements, the washers lodge individually in the notches 43, and as they pass upwardly with the disk above the quantity of washers, they are retained in the notches by reason of the inclined position of the disk, the washers then standing on edge and leaning against the metal forming the rear wall of the notch substantially parallel to the plane of the disk. As before stated, when they reach a given position they drop one at a time into the delivery chute 26.

Generally each notch contains a single washer, but if, as sometimes happens, two washers become lodged in any of the notches, the extra washers are brushed off before they reach the point of delivery to the chute 26 by brushes in this instance in the form of depending coil springs 45 which, as shown in Figs. 4 and 6, are secured to the inner side of the rear wall of the hopper and extend down in front of and in engagement with the inner notched side of the disk 41.

For each cycle of the machine (during which a washer is assembled on a screw), the disk 41 is given a step-by-step movement equivalent to the distance between the notches 43, and when a notch with a washer in it reaches the upper end of the chute 26, at which point the opening in the chute communicates with the interior of the hopper in line with the notched face of the disk 41, the washer slides or rolls out of the notch into the chute opening and slides down the chute, as already stated, it being noted that there is never more than one washer in the chute at one time.

Figure 5:
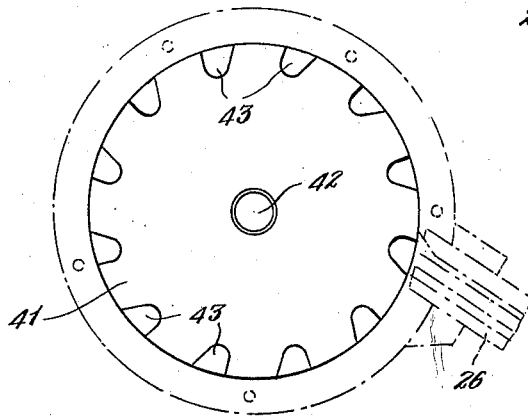
Fig. 5 is a detail of the disk forming a part of the feed mechanism in this instance for the washers, this view showing the disk as viewed from the line 5—5 of Figs. 2 and 6 and showing part of the hopper and part of the delivery chute by dotted lines.

I will next describe the mechanism for actuating the disk 41 of the washer feed mechanism. It was previously stated that the cam shaft 34 through the sprocket chain 35 rotates a shaft 36 which is instrumental in the operation of the disk 41 of the washer feed mechanism. This shaft 36, like the cam shaft 34, rotates continuously as long as the machine is in operation and it is rotated at the same speed as the cam shaft 34 so that the operation of the washer feed mechanism, the screw delivery mechanism, and the pusher in predetermined timed relation is assured. The shaft 36 is provided with a cam 46 (see Fig. 2) which is engaged by a roller 47 carried by a pitman 48 the upper end of which has a ball and socket connection shown at 49 in Fig. 2 with one arm 50 of a bell crank 51 loosely mounted on the shaft 42 to which is secured the washer feed disk 41. A spring 52 which is connected to the arm 50 of the bell crank 51 keeps the roller 47 in contact with the periphery of the cam 46. The other arm 53 of the bell crank 51 carries a spring-pressed pawl 54 which engages a ratchet wheel 55 also mounted on the shaft 42. A yieldable driving connection is provided between the ratchet wheel 55 and the shaft 42 and the detail of this is shown in Fig. 3. It will be noted that the hub 56 of the bell crank 51 is partly surrounded by a spiral spring 57. One end of this spring is anchored to the hub 56 by means of a screw 58 or otherwise and the other end of the spring is connected to a pin 59 which extends through an arc-shaped slot 60 in the hub and is connected to the shaft 42 to which the washer feed disk 41 is secured. There are as many teeth in the ratchet 55 as there are washer receiving notches at the periphery of the disk 41, and in each cycle of the machine the disk 41 is moved the distance between the teeth of the ratchet and therefore the disk is given an angular movement equal to the distance between the peripheral notches. At the completion of each movement of the ratchet wheel 55 one of the peripheral notches of the disk is opposite the mouth or entrance opening of the washer delivery chute 26, as shown in Fig. 5. The spring 57 normally functions to turn the shaft 42 and the disk 41 the full distance each time the pawl 54 actuates the ratchet wheel, but if for any reason the washer feed disk 41 becomes stalled, as by clogging of the washers, the spring 57 will yield and the ratchet will make idle strokes without turning the disk 41 until the trouble is remedied, and this can take place without breakage of any of the parts.

It will be noted that the roller 47 which engages the cam 46 on shaft 36 has a rounded periphery and, as pointed out above, the upper end of the pitman 48 has a ball and socket connection with one arm of the bell crank on shaft 42. This arrangement permits the adjustment of the hopper 25 and the parts associated with it by turning the screw 40 after the usual holding screws have been loosened without disarranging the mechanism for imparting the step-by-step movements to the washer feed disk 41.

Figure 10:
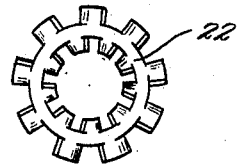
Fig. 10 is a view similar to Fig. 9 but showing a lock washer toothed at its inner and outer peripheries.

It will be seen that small irregularly shaped articles, such as lock washers which are generally several times smaller than illustrated in Figs. 9 and 10, are fed from the mass of loose articles in the hopper at regular intervals and one at a time to the assembling point. Thus the prehandling of the articles, as by arranging them in columnar form in a magazine, and the time required to refill the magazine are saved, it being only necessary that the attendant, who usually takes care of several of these machines, from time to time dump a shovelful of washers or other articles into each of the hoppers of the several machines. The feeding mechanism herein illustrated is very reliable in operation and only at rare intervals or in rare cycles does a washer fail to be delivered at the proper instant or point in the cycle to the assembling point, and only very occasionally is the yieldable connection between the ratchet and the shaft carrying the feed disk required to funcion to prevent breakage in any part of the step-by-step disk actuating mechanism. Thus it will be seen that the object stated at the beginning of the specification is attained very effectively.

While I have shown the preferred construction, I do not desire to be confined to the precise details illustrated but aim in my claims to cover all modifications which do not involve a departure from the spirit and the scope of the invention.

Having thus described my invention, I claim:

1. A feeding mechanism including a hopper for receiving a batch or mass of loose articles, a delivery chute extending from the hopper, a delivery member for delivering the articles one at a time from the hopper to the upper end of the delivery chute, said delivery member being in the form of a disk, a shaft for supporting and rotating said disk with its axis inclined with respect to both the horizontal and the vertical, said disk having equally spaced peripheral notches each adapted to receive one of said articles in the lower part of the hopper when the lower part of the disk passes through said batch or mass of articles and to elevate the same and deliver it to the upper end of said chute, and means for giving said disk step-by-step movements equivalent to the angular distance between the notches, said means comprising a ratchet wheel mounted on said shaft, a bell crank lever loosely mounted on the shaft, a pawl pivotally connected with one arm of the bell crank lever and engaging the ratchet wheel to actuate the same, a power shaft, and means operatively connecting said power shaft with the second arm of the bell crank lever.

2. A feeding mechanism including a hopper for receiving a batch or mass of loose articles, a delivery chute extending from the hopper, a delivery member for delivering the articles one at a time from the hopper to the upper end of the delivery chute, said delivery member being in the form of a disk, a shaft for supporting and rotating said disk with its axis inclined with respect to both the horizontal and the vertical, said disk having equally spaced peripheral notches each adapted to receive one of said articles in the lower part of the hopper when the lower part of the disk passes through said batch or mass of articles and to elevate the same and deliver it to the upper end of said chute, and means for giving said disk step-by-step movements equivalent to the angular distance between the notches, said means comprising a power shaft, a ratchet wheel on the first named shaft, a pawl for actuating said ratchet wheel, means having an operative connection with said pawl and with said power shaft for actuating said pawl, and a yielding connection between said ratchet wheel and the first named shaft.

FRANK B. DAVIS.